April 9, 1929.  L. M. HULL  1,708,576
MOLDING MIXTURE
Original Filed Sept. 1, 1925
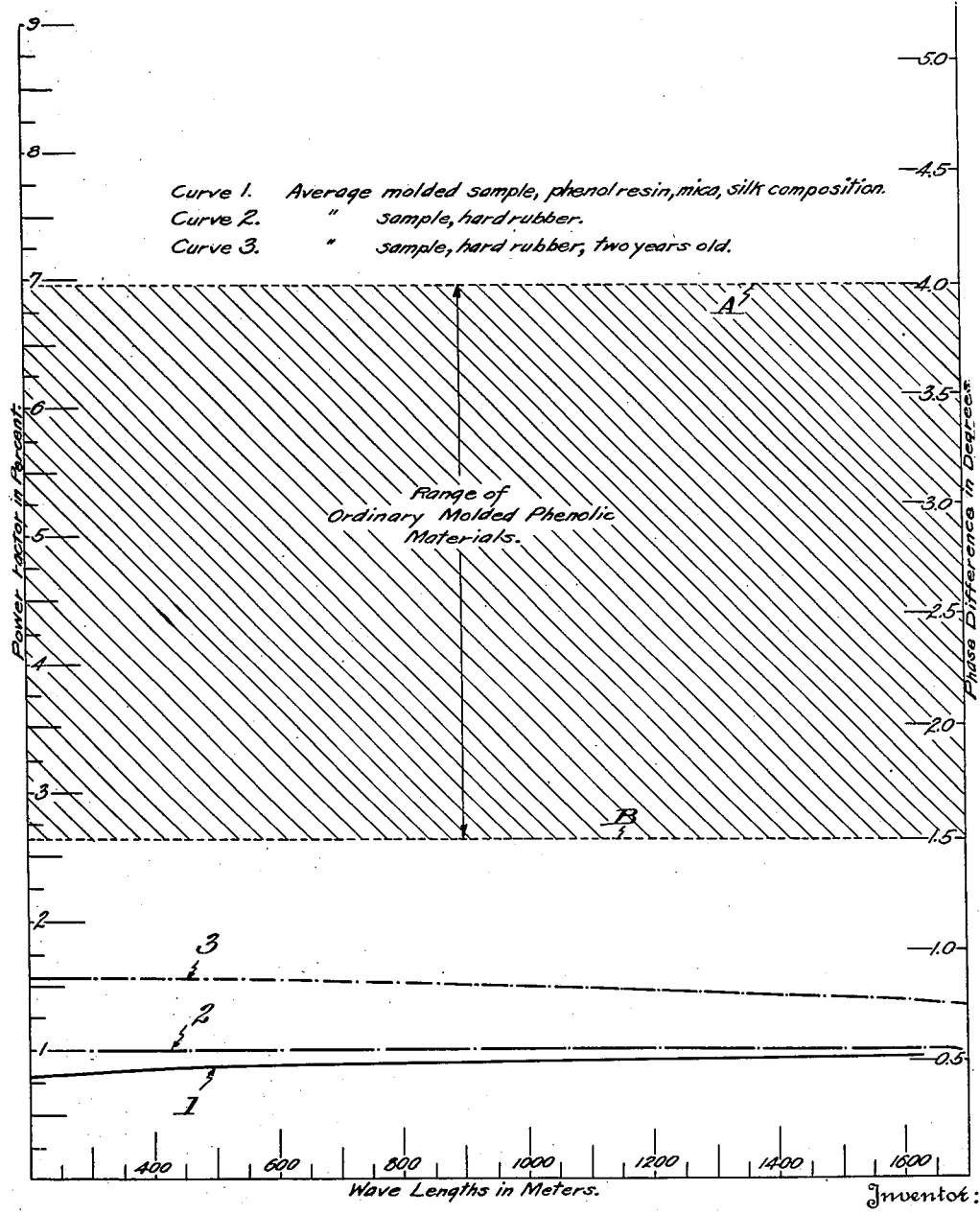

Patented Apr. 9, 1929.

1,708,576

UNITED STATES PATENT OFFICE.

LEWIS M. HULL, OF BOONTON, NEW JERSEY, ASSIGNOR TO RADIO FREQUENCY LABORATORIES INCORPORATED, OF BOONTON, NEW JERSEY, A CORPORATION OF NEW JERSEY.

MOLDING MIXTURE.

Continuation of application Serial No. 53,947, filed September 1, 1925. This application filed June 30, 1926. Serial No. 119,570.

This invention relates to molding mixtures of the known type having a binder consisting wholly or in part of a reactive phenolic-resin, admixed with an inert filler, and to molded articles made therefrom. A primary object of the invention is to provide such a mixture which, when subjected to pressure-molding with coincident, or in some cases with subsequent, heating will yield a molded product possessing in full measure the well-known advantages and desirable qualities of the commercial phenol-resin molded articles, such for example as those in which the filling material is wood-flour (high mechanical strength, good molding quality, excellent surface characteristics coupled with faithful reproduction of the mold, permanence as against the action of moisture and ordinary temperature changes, etc.) and in addition thereto having at all frequencies (including radio frequencies) a distinctly lower dielectric hysteresis than that which characterizes the said commercial molded articles as heretofore produced. Representative phase difference values for these commercial molded articles lie between 1.5 and 4.0 degrees, corresponding to a power factor of about 2.6 to 7.0% (compare Technologic Paper of the Bureau of Standards, No. 216, page 622).

My investigations of a series of specially compounded mixtures, comprising various reactive phenol resins with commercial fillers, have shown that the dielectric hysteresis in the molded article increases as a rule rather rapidly with the proportion of filler used, clearly indicating that the relatively high hysteresis characterizing certain commercial products of this type is attributable rather to the filler used than to the resin component. This indicated the possibility, at least, of preparing a mixture which would yield a molded article of low dielectric hysteresis, approximating for example that of hard rubber; and my further investigations have resulted in the development of such mixtures, combining excellent electrical properties with satisfactory mechanical and molding qualities, as hereinbelow explained.

A molding mixture of this novel kind comprises, in general, a phenolic resin having charactertistics as described below, and a suitable inert filler of a type to be set forth. It may or may not contain fibrous matter of a character suitable to increase the tensile strength, or impart other desirable properties to the molded article, without unduly detracting from its dielectric properties.

The reactive phenol resin consists preferably of a resinous condensation product of phenol, cresol, or the like, with formaldehyde or other methylene-containing body, which resin will, on sufficient application of heat, become transformed to the infusible or resinoid modification. I have ascertained that some of these phenolic resins, in the absence of any filler, will yield a hardened product of low dielectric hysteresis, and I use such low hysteresis resins for the purpose of this invention. The suitability of any particular resin may thus be determined by simple and direct test, resins having a phase angle difference of 1.0°, or lower, when measured at a wave-length of 300 meters, being preferably selected. Phenolic resins having a phase angle difference of 0.66° and 0.71° are now available.

As a filler for my novel molding composition I may suitably employ an inert solid which possesses the two qualities of low inherent phase angle difference, and of remaining unchanged and non-reactive as regards the other ingredients, during the process of molding. Examples of such solids, which I have experimentally determined to be satisfactory, are mica and silica, and powdered vitreous materials such as glass and quartz. Either of these substances may be used alone, or a mixture may be employed. I have found mica to be somewhat preferable to silica as regards the molding qualities of the resulting mixture, although the dielectric qualities are satisfactory in both cases. While powdered hard-rubber possesses a low phase angle difference, I have found that it is subject to such change during the molding process that the phase angle difference of the resulting molded dielectric may be very high.

It is, therefore, an example of an unsuitable filling material.

In using mica as a filler I have found that flakes, say one-eighth of an inch across, give satisfactory results. However, the molding qualities of the mixture may be improved by powdering the mica to 100 mesh size and preferably to 200 mesh. If silica or quartz are used they should be in powdered form.

A satisfactory mixture may be compounded from the ingredients described above. In certain cases, however, it may be desired to increase the tensile strength of the final product. To this end a fibrous or cellulosic material may be added to the molding mixture, and the criterion for the selection of such a fibrous material is that it must not too far detract from the dielectric qualities of the mixture resulting from the resin and inert filler alone. I have found silk, cotton, and other fibrous or cellulosic materials to be satisfactory for this purpose. If silk is employed a satisfactory grade is raw Chinese silk which has not been "boiled off". Cotton which is carefully dried, as by baking or otherwise, may be substituted for silk at only a slight sacrifice of dielectric quality. I have found that as much as say 25% of silk may be used without unduly increasing the phase angle difference of the resulting product. Cotton, however, must be used in quantities not exceeding say 3% if the phase difference of the molded product is to remain below 1.0°. Other fibrous or cellulosic materials may be employed in a similar manner, and in such case the proportions are to be regulated so as not unduly to increase the phase angle difference. For producing small or complicated molded parts from my invention the fibrous material, if used, is preferably run through a cutting machine before mixing with the other ingredients, so that the individual fibres are from one eighth to one quarter inch long.

Certain other materials such as fluxes, hardening agents, release materials, plasticizing agents, pigments, or dyes, and the like, may of course be added in the well-understood manner, provided that they are of such nature as not to interfere with the desired and essential properties of the mixture. I have found carnauba wax to be a satisfactory flux. It may be entirely omitted or used in various quantities up to about 2%, depending upon the desired molding characteristics. Small amounts of hexamethylenetetramine may be employed, if desired, as a hardening agent for the resin. While this is not necessary, I have found that it serves to increase the heat-resisting qualities of the final article, as well as its mechanical strength.

The proportions of the mixtures may be varied to a considerable extent according to the degree of plasticity desired. One composition which I have found to give excellent results, both in the laboratory and on a commercial scale, comprises:

| | Per cent by weight. |
|---|---|
| Reactive phenol resin (phase angle difference 0.66°) | 45 |
| Ground mica (200 mesh screen) | 51 |
| Raw silk (Chinese, unwashed) | 3 |
| Carnauba wax (flux) | 1 |

The behavior of molded samples having this composition is shown by curve (1) of the figure, as hereinafter described.

In experimenting upon a large scale I have found that the molding qualities of this mixture may be improved by increasing the proportion of wax in the above mixture to 2% and reducing the mica content to 50%. In this event the phase difference may vary from about 0.38° to about 0.45° at 350 meters wavelength, depending upon the time allowed in molding.

If it is desired to obtain a particularly heat-resisting product the composition may be varied as follows:

| | Per cent by weight. |
|---|---|
| Reactive phenol resin (phase angle difference 0.66°) | 46½ |
| Mica (ground, 200 mesh) | 46½ |
| Hexamethylenetetramine | 2 |
| Silk (raw, Chinese) | 3 |
| Wax (carnauba, flux) | 2 |

The phase difference of this mixture is approximately 0.7° at 350 meters, as measured on the molded product.

Another typical composition, in which the silk is replaced by cotton, is as follows:

| | Per cent by weight. |
|---|---|
| Reactive phenol resin (phase angle difference less than 1.0°) | 45 |
| Ground mica | 52 |
| Dry white cotton | 2 |
| Carnauba wax | 1 |

This mixture possesses a phase difference of about 0.75° at 300 meters.

Typical compositions in which the fibrous material is entirely dispensed with are the following:—

| | Per cent by weight. |
|---|---|
| Reactive phenol resin (phase angle difference 0.66°) | 55 |
| Ground mica (200 mesh) | 45 | having a phase difference of about 0.35° at 330 meters.

| | Per cent by weight. |
|---|---|
| Reactive phenol resin (phase angle difference less than 1.0°) | 75 |
| Powdered silica | 25 | having a phase difference of about 0.88° at 300 meters, and:—

| | Per cent by weight. |
|---|---|
| Reactive phenol resin (phase angle difference less than 1.0°) | 25 |
| Powdered silica | 75 | having a phase difference of about 0.95° at 300 meters.

I have also found that in some cases the fibrous material may itself constitute the inert, non-changing, filler. An example of such a composition is:—

| | Per cent. |
|---|---|
| Phenol resin (phase angle difference less than 1.0°) | 75 |
| Raw Chinese silk, unwashed | 25 | having a phase difference of about 0.93° at 300 meters.

In general, these mixtures flow well in the mold, cure in normal time, and yield molded articles of excellent mechanical strength, surface characteristics and permanence. These molded articles have a very low dielectric hysteresis as compared with known phenol-resin molded articles, comparing favorably in this respect with hard rubber. As is well known hard rubber tends to deteriorate in this respect with age and use, whereas no such tendency has been observed with my novel composition, which, in its preferred embodiments, is distinctly superior to old rubber, and closely approximates new rubber, as regards hysteresis losses.

Data regarding dielectric losses at various wave lengths between 200 and 1600 meters are plotted in the accompanying diagram, wherein curve 1 indicates such losses in a certain molded product compounded in accordance with the first formula herein given, and measured in the molded sample according to the specifications of the American Society for Testing Materials, (vol. 23—part 1, pages 827–840); the dielectric losses being expressed in terms of degrees phase difference, and also in percent power factor, the latter being the trigonometric sine of the phase difference angle. In this connection it will of course be understood that material variations may occur, in the use of a particular molding mixture, according to the particular molding conditions, or after-curing employed; which in turn is largely determined by the size, shape and character of the molded piece.

As a rule a mixture compounded in accordance with this invention, and properly cured, should have a phase difference not exceeding about 1.0 degree in the vicinity of 300 meters (frequencies about 1,000 kilocycles). I have found it possible to produce commercial molded products compounded in accordance with this invention which have a phase difference even lower than this figure, as, for example, the specimen from which curve 1 was plotted.

Curve 2 represents the dielectric losses over the same frequency range in a typical sample of new hard rubber; and curve 3 in a typical sample of hard rubber two years old. (Compare Bureau of Standards, Technologic Paper No. 216, page 622). Hard rubber is rather variable in both composition and properties, and relatively wide variations in the power factor are not uncommon in commercial samples.

The molded phenol resin compositions listed in the Bureau of Standards publication mentioned above (see Table 47) fall within the limits of 1.5 to 4.0 degrees phase difference, that is to say within the area lying between the lines marked A and B in the diagram.

It will be observed that molded articles prepared in accordance with this invention are far superior as regards dielectric losses to phenolic resin compositions as heretofore made; and they are also far superior to hard rubber in respect to permanence.

The possession of this desirable property is of course of great advantage in numerous applications, particularly in the radio transmission and reception fields, as will readily be understood by those skilled in these arts. I have found the material particularly desirable for such uses as condenser parts, transformer parts, tube sockets and the like.

This application is a continuation of my co-pending application Serial No. 53,947 filed September 1, 1925.

I claim:

1. A molding mixture comprising a reactive phenol resin, and a filler comprising mica and silk.

2. A molding mixture comprising a reactive phenol resin, and a filler comprising mica and silk, the mica in finely powdered form and in predominating proportion by weight.

3. A molding mixture comprising a reactive phenol resin, and a filler comprising powdered mica, and silk containing the natural gums.

4. A molding mixture containing by weight, powdered mica, forty to sixty parts; raw silk, two to eight parts; the balance consisting chiefly of a phenol resin of the reactive type.

5. A molded article characterized by low dielectric hysteresis and comprising a hardened phenol resin, mica and silk.

6. A molding mixture comprising a reactive phenol resin having a phase angle difference not exceeding 1.0 degree and a filler comprising mica and a fibrous material of high insulating value, the mica largely predominating.

7. A molding mixture comprising a reactive phenol resin having a phase angle difference not exceeding 1.0 degree and a filler comprising mica and a fibrous material of high insulating value, in the approximate proportions: reactive resin, 45 parts; mica, 50 parts; fibrous material, 3 parts; flux, 2 parts; said mixture yielding under standard molding conditions a molded product having the essential physical and mechanical characteristics of the hardened phenol-resinoid products, and characterized by a phase difference not exceeding 1.0 degree.

8. A molding mixture comprising a reactive phenol resin and a filler comprising a mineral substance of high insulating value and silk.

9. A molding mixture comprising a low hysteresis phenolic resin and a filler which is substantially non-reactive during the molding process, and which does not substantially increase the hysteresis loss in the resulting molded product, said product being characterized by a phase difference not exceeding about 1°.

In testimony whereof, I affix my signature.

LEWIS M. HULL.